METHOD OF TREATING THE SURFACE OF SOLIDS WITH LIQUIDS

Filed Feb. 23, 1954 2 Sheets-Sheet 1

INVENTORS: J. H. EIGLER
MILES V. SULLIVAN
BY D. H. Wilson, Jr.
ATTORNEY

INVENTORS: J. H. EIGLER
MILES V. SULLIVAN
BY D. H. Wilson, Jr.
ATTORNEY 2,797,193

METHOD OF TREATING THE SURFACE OF SOLIDS WITH LIQUIDS

John H. Eigler, Plainfield, and Miles V. Sullivan, Summit, N. J., assignors to Bell Telephone Laboratories, Incorporated, New York, N. Y., a corporation of New York Application February 23, 1954, Serial No. 411,603
7 Claims. (Cl. 204—143)

This invention relates to methods of and apparatus for treating localized areas of rigid bodies with liquids. It is contemplated as applicable to washing and rinsing processes, coating processes, and etching processes for the surfaces of rigid bodies.

The objects of the invention are to facilitate the handling and distribution of liquids, to enable a fluid to be applied to a limited portion of the surface of a rigid body, and to make practicable the treatment of a limited portion of the surface of a rigid body with a flowing stream of liquid.

Particular objects of this invention are to facilitate the manufacture of semiconductive translators, to reduce the number of processing operations in producing such translators, to afford a means for stream etching a localized area of the surface of a semiconductive body, to eliminate the need for the application and the removal of the masking material in the process of etching localized surfaces of semiconductive bodies, and to enable semiconductive bodies to be etched at advanced stages of their fabrication.

In accordance with the above objects a feature of the invention comprises sustaining a stream of liquid flowing over a localized area of the surface of a body by the forces of adhesion and surface tension.

Another feature resides in controlling the position of a stream of liquid by adjusting the adhesive and surface tension forces supporting the liquid employed in the process by the liquid composition, composition and structure of the materials being processed, composition and structure of auxiliary elements of the processing apparatus, and orientation of the surfaces being processed and the auxiliary elements of the processing apparatus.

A feature of the invention particularly applicable to the manufacture of semiconductive translators comprises eliminating the need for masking in the etching of localized areas of bodies by confining the liquid etchant by surface tension and adhesive forces and further avoiding a contamination of the etched surface with reaction products by applying the liquid etchant as a confined stream which sweeps those products away from the surface. The elimination of the masking operation affords advantages in manufacture in addition to the removal of that step from the process since it eliminates a trap for contaminants in the form of the masking material and eliminates the unmasking operation usually required following the etch.

Another feature of this invention resides in increasing the rate of electrolytic etching which can be applied to small semiconductive bodies by employing rapid liquid flow rates over the electrodes to reduce polarization and increase heat dissipation, thereby allowing higher current densities to be employed.

Another feature resides in the use of a number of forms of etching heads which permit etching to be accomplished on several forms of specimens and at any of several stages of fabrication. Semiconductive bodies for translators can be etched in accordance with this invention over localized areas of their surfaces with leads attached thereto and subsequent to their mounting on supporting structures by a proper choice of etching head.

In one embodiment of this invention a bar of semiconductive material is processed by passing a stream of liquid over a band intermediate its ends and surrounding its major axis without contacting the bar ends or surfaces in their immediate vicinity. This is accomplished by admitting a stream of liquid between a pair of liquid supporting members so that it wets them and flows along them in a sheet or web bridging the space between them. The bar is located between the members with its major axis substantially normal to the liquid sheet or web. The wetting of the bar by the liquid is confined to a portion of the bar between the members by surface tension forces in the liquid. Specifically, n-p-n semiconductive bars as employed in transistor structures of the type disclosed in W. Shockley's Patent 2,569,347, issued September 25, 1951, require an etch of the p-type section and the n-p emitter and collector junctions bounding that section subsequent to the application of the emitter and collector leads to the bar ends. These contacts are adversely affected by contact with etchants. Hence, either a chemical or an electrolytic stream etch can be applied by a method of liquid distribution as contemplated by this invention wherein a web of the etchant is formed and its contact with the semiconductive body and associated elements is restricted to the limited region where etching is desired without subjecting the contacts and the semiconductor in their vicinity to any detrimental etching action.

The above and other objects and features of this invention will be more fully appreciated from the following detailed description when read with the accompanying drawings, in which.

Figure 1:
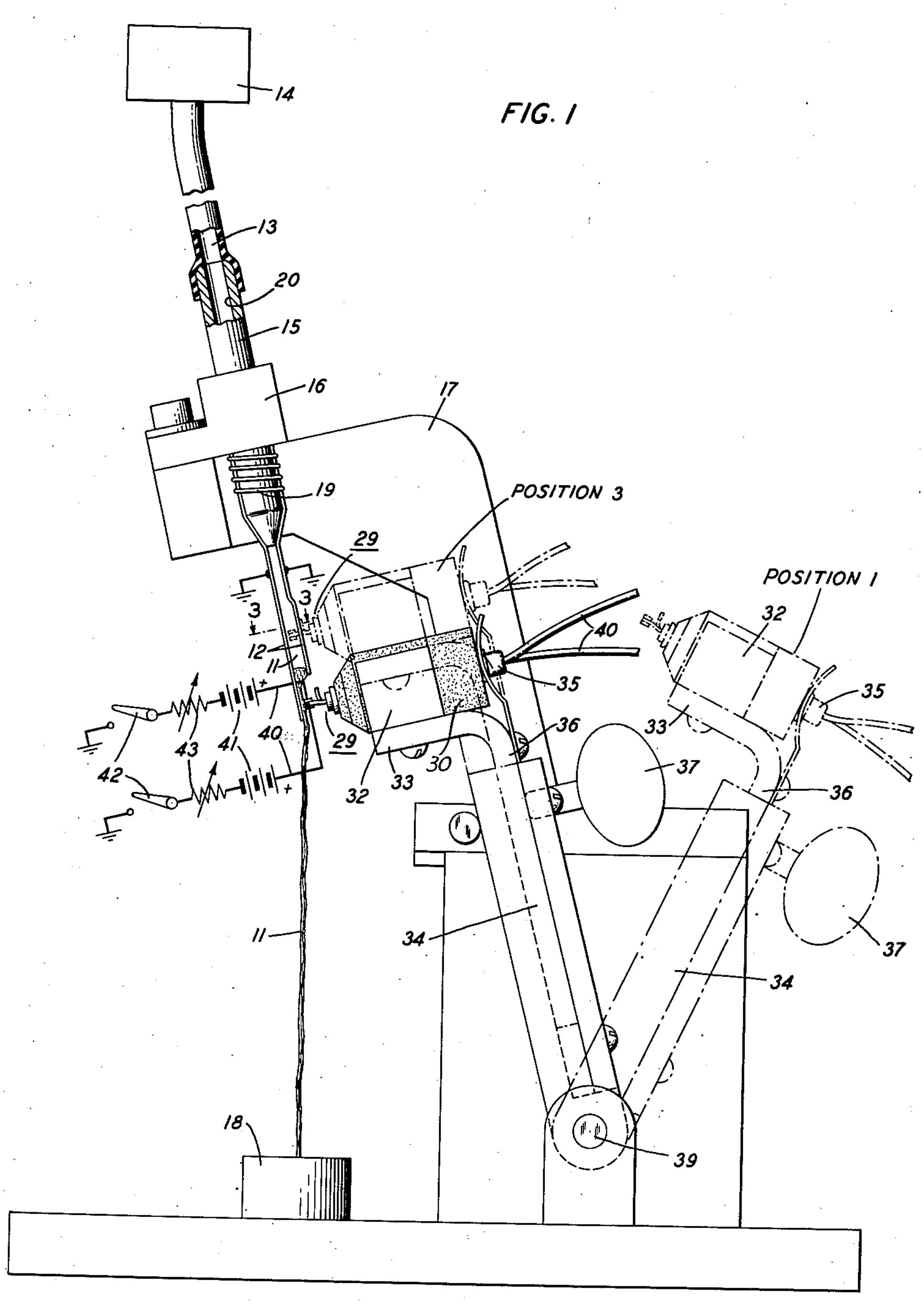
Fig. 1 is an elevational view of an etching fixture employed in practicing the method of this invention showing a schematic etching circuit and phantom views of several positions in which a portion of the device is placed during the processing operations.

In the processing of many semiconductive devices, particularly those of germanium, silicon and the intermetallic compounds, it is desirable or necessary to obtain a chemically clean surface which exhibits an undisrupted crystal structure. It has been the usual practice to apply contacts to a cleaned and etched surface of semiconductive body by some means affording a mechanical bond and to follow this with a surface cleaning etch. Since the etchants employed are of a character such that they react with most or all of the elements of the device with which they come in contact, it has been found necessary to mask all portions of the device except that portion of the semiconductive body to be etched to avoid destruction of the other elements and to avoid contamination of the semiconductive surface by the reaction products of the extraneous etching actions. Application and removal of the masking materials together with faulty masking and breakage of delicate elements in the handling incident to the masking operations cause this phase of the manufacturing operations to add greatly to the expense of manufacture and thus the final cost of the product. Further, in some instances it has been impossible to adequately clean semiconductive surfaces after certain steps which occur rather early in the porcessing of the devices.

The application of a localized stream etch to semiconductive bodies in accordance with this invention avoids the problems incident to masking and sweeps reaction products out of the vicinity of the surface before they have an opportunity to contaminate it. This invention contemplates several modes of applying localized stream etches to semiconductive bodies at much later instances in the processing of those bodies into translating devices than have heretofore been practical, particularly in large scale manufacture. In all of these modes of application a liquid stream is caused to flow within a confined web oriented so that a plane of limited extent can be passed through two of its interfaces without contacting the web supporting member or members and the surface to be treated is located in that plane. Thus in one instance the stream bridges two spaced apart members which may lie in a common plane so that it has an interface with the ambient on each side of that plane and the member being treated is positioned normal to that plane so that it projects through both liquid-ambient interfaces. In another instance the stream is formed with a convex meniscus projecting beyond the stream support so that a plane can be passed through the curved liquid-ambient interface twice without contacting the support and the surface to be treated is positioned on that plane in contact with the meniscus.

While the methods of applying liquid streams to localized areas of solid bodies, particularly of small bodies, as contemplated in this invention, are disclosed hereinafter principally as applied to electrolytic etching operations in the manufacture of semiconductive translators, it is to be understood that these methods are applicable to other materials and structures and are also applicable to other processes such as chemical etching, electroplating, cataphoretic or other coating techniques, together with other cleaning and rinsing processes.

One application wherein a stream of electrolyte employed in electrolytic etching is confined by its adhesion to suitable supporting members and by its surface tension so that it flows over only a limited area of a semiconductive body in accordance with this invention is employed in the manufacture of translators having bar-shaped semiconductive bodies. Apparatus for the practice of this application of the invention is shown in Fig. 1. In this process a fine stream of electrolyte 11, such as potassium hydroxide, sodium hydroxide, dilute hydrochloric acid, and the like, is admitted between a pair of spaced pins 12 so that it wets and adheres to those pins and flows along them in a sheet or web. A pressure gradient is established along the pins 12 to cause the electrolyte to flow from a source over a specimen to be etched and into a waste receptacle 18, for example by mounting the pins so that the axis of the sheet is other than horizontal. Control of the location of the electrolyte intermediate the pins is facilitated by orienting them so that the sheet lies in a vertical plane.

In the specific embodiment of an etching fixture for bar-shaped bodies disclosed in Fig. 1, an etchant is supplied by means of tubing 13 from reservoir 14 to nipple 15 which is fitted into a clamp 16 near the end of arm 17. A conical end is provided on the nipple 15. A pair of pins 12 are secured in slots in the surface of and parallel to the axis of the nipple by a circumferentially expanded helical spring 19 embracing the nipple and the ends of the pins. These pins may be of any material which has suitable adhesion characteristics with respect to the liquid being handled to sustain it and which is inert to the liquid. In processes such as that under consideration the pins may be formed from gold plated drill rod, tantalum, platinum, or other conductive materials which are not detrimentally affected by the electrolytic reactions or the electrolyte. The pins are formed to follow the conical contour of the nipple and extend beyond its end parallel and spaced from each other. The bore 20 within the nipple 15 is constricted at its lower end to feed electrolyte between the pins 12 at a uniform rate. As the electrolyte flows from the nipple it wets both pins, forms a web between them, and flows along them under the influence of gravity in the form of a sheet of liquid.

Figure 2:
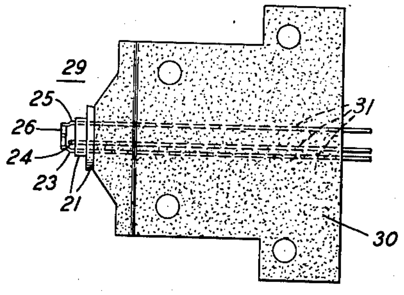
Fig. 2 is an elevational view of a partially fabricated semiconductive translator and a holder therefor.

A partially processed semiconductive translator typical of the type to be etched in the fixture of Fig. 1 is disclosed in Fig. 2. It comprises a header for the translator housing including an outer metallic ring or eyelet 21 having an open center in which is sealed a button of insulating material 22 such as glass having a plurality of leads 23, 24, and 25 sealed therethrough. A semiconductive bar 26, for example a bar of germanium having a p-type zone intermediate ends of n-type material, is secured to the header leads 23 and 25 at each of the bar ends by solder or other form of conductive bond. The portion of the bar intermediate its ends requires chemical cleaning subsequent to its attachment to leads 23 and 25, preferably just prior to the mounting of a base electrode on p-type zone 27 and final capsulation. At this point in the fabrication process the pin 24 for supporting the electrode to zone 27 is bent at right angles to the plane of electrodes 23 and 25 to facilitate etching.

Header assembly 29 is supported in holder 30 which may comprise a block of insulating material such as Teflon having holes 31 extending therethrough for the reception of the extensions of leads 23, 24, and 25. The leads are somewhat longer than the thickness of holder 30 so that their ends project from the holder. In etching, the bar, the header assembly, and holder are received from preceding manufacturing operations as a unit and are mounted on the etching fixture of Fig. 1 in a suitable receptacle or bracket 32 on right angle extension 33 of arm 34 while it is in position 1 shown in phantom and the ends of the leads are engaged by a conventional transistor socket 35 to make electrical contact therewith. Arm 34 is then caused to swing around its pivot 39 so that its axis is parallel to the axis of the web of electrolyte, 0.1 percent by weight of potassium hydroxide in deionized water (solution resistivity of about 200 ohm-centimeters) between pins 12 and so that the germanium bar 26 is intercepted by and normal to an extension of that axis. Arm 34 is then advanced along its axis to move bar 25 along the axis of the web of electrolyte and into that web between pins 12 by sliding the telescoping section 36 of arm 34 from within the arm to the advanced position (position 3) shown in phantom in Fig. 1. The arm is then locked in this advanced position by thumb screw 37.

Figures 3, 5:
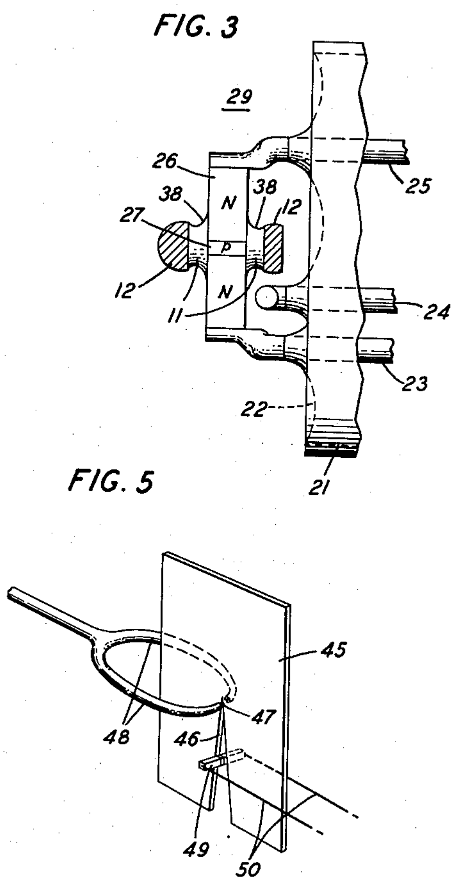
Fig. 3 is an enlarged elevational view taken along line 3—3 of Fig. 1 showing a portion of the partially completed semiconductive translator shown in Fig. 2 and illustrating its relationship to the liquid and its supporting pins during the etching of the translator in the fixture of Fig. 1.
Fig. 5 is a perspective showing another arrangement for applying a stream of liquid to a restricted portion of a body as applicable to the processing of a semiconductor.
Figure 4:
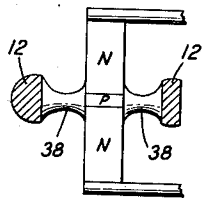
Fig. 4 is an enlarged elevational view of a semiconductive bar and modified liquid support pin.

When the bar 26 is positioned between pins 12, it will be noted that by virtue of the inclination from the vertical of the web axis the header assembly 29 is positioned above the stream of electrolyte thereby avoiding the danger of wetting it. By mounting the bar 26 so that its axis is horizontal and normal to the vertical plane of the web 11 a balance of forces is obtained which tends to eliminate an unequal distribution of the flowing liquid web 11 along the bar surface and to center the wetted band on the specimen in a region under the supporting member 12. This localization of the web 11 on the bar surface is further facilitated by a balance of adhesive and surface tension forces of the liquid. The liquid must adhere to the supporting members, pins 12, and may or may not adhere to the material of the solid body being treated. Surface tension must be present to sustain the web. Surface tension tends to minimize the area of the air-liquid interfaces 38 of the web 11 so that when the liquid is supplied to the pins at a rate which limits the liquid volume between them to a quantity which wets only the opposing faces of the pins, as illustrated in Figs. 3 and 4, the interfaces 38 are drawn toward each other. The adhesive properties of the liquid to the pins 12 and body 26 tend to cause it to spread over the pin and body surfaces thereby opposing the surface tension forces and causing a divergence of the interfaces 38 adjacent these members. This tendency of the interfaces to diverge near the wetted solid members and converge intermediate those members is shown in Fig. 3.

The width of the band on the specimen contacted by the liquid is determined in part by the width of the support members 12 and the quantity of liquid between them. The width of the web or extent of interface divergence at the surface of the specimen being processed can be adjusted by adjusting the balance between the surface tension effects and the adhesion forces. It is to be appreciated that a liquid can be chosen which does not readily wet the specimen and will form a contact angle of less than 90 degrees therewith and thus will contact a band of narrower width than the major portion of liquid web.

Fig. 4 illustrates another method of reducing the width of the band on the specimen contacted by the liquid. Where the conditions as to rate of flow, materials, temperature, current density (in the case of electrolytic processing), and the like are maintained constant, the band can be narrowed by increasing the separation of the liquid supporting members 12 so that the volume of liquid available is redistributed to a longer but narrower cross section.

An appreciation of the difficulties present in effecting an electrolytic etching of a device of the type illustrated in Figs. 1 through 4 of the drawings will be obtained from a consideration of the dimensions of the elements involved. The pins 12 are formed from 40 mil diameter rod flattened on the sides adjacent the region which is to receive the specimen by the removal of 10 mils of material. These pins are adjusted to an 86 mil clearance. The semiconductive bar 26 has a square cross section about 32 mils on a side and clears the header by about 50 mils. In order to insure a reasonable clearance between the upper pin and the header, for example about 10 mils, the bar is positioned somewhat closer to the upper pin and the upper pin is thinned to 20 mils by flattening its face opposite the specimen. Thus, the bar 26 is separated from the lower pin by about 34 mils and from the upper pin by about 20 mils. With these spacings and a potassium hydroxide solution of 0.1 percent by weight flowing at about 15 cubic centimeters per minute, the 125 mil long germanium bar is wetted over about 85 mils of its length, leaving about 20 mils untouched on each end. Etching under these conditions for two minutes with a current of 80±10 milliamperes in each end of the bar results in the removal of about three to four mils of material from each face of the bar over the length wetted.

Electrolytic etching of a narrow band around the bar contacted by the web of electrolyte is effected by connecting the electrolyte support pins 12 as cathodes in an etching circuit while the electrodes 23 and 25 on the ends of bar 26 are connected as anodes. The etching circuit is shown schematically on the left side of Fig. 1. It consists of leads 40 extending from connectors in socket 35 to the positive pole of a source 41, through a switch 42 which may be controlled by a timer (not shown), a current controlling resistance 43, and ground while the pins 12 are also grounded to complete the circuit. Advantageously, the current source is arranged so that both ends of the semiconductive bar receive constant and equal amounts of current so that a uniform etching rate is obstained on both sides of the intermediate zone 27. Since the electrolyte employed is very dilute it is of high resistance, at least on order of magnitude greater resistivity than the material of the specimen, and does not tend to shunt the p-zone 27. Etching action tends to concentrate in the region of the specimen immediately under the electrodes due to the high resistivity of the electrolyte. Thus, a substantial portion of the current flows across the reverse biased n-p junctions between zone 27 and the bar ends within the bulk of the material and then flows across the interface between the p-type material and the electrolyte to etch that region at a rate comparable to the rate of etching at the electrolyte-semiconductor interface of the n-type zones. This technique is equally applicable in the etching of single junction, n-p semiconductive bars.

Another form of electrode with which bars were etched consisted of a 10 mil thick tantalum plate 45 having a V notch 46 about 50 mils wide at its axial center cut in one edge as shown in Fig. 5. Electrolyte was fed to the apex 47 of notch 46 from tubes 48 forming nozzles directed toward both faces of the plate and formed a web (not shown) which flowed along the notch to the point where the walls diverge to such an extent that the surface tension of the electrolyte was insufficient to sustain it over the separation. The spent electrolyte fell from the plate and was collected in a manner such as shown in Fig. 1. A bar 49 mounted on long leads 50 can be positioned within the slot and out of contact with the plate 45 while an etching circuit such as that shown in Fig. 1 can be associated with the leads 50 and plate 45 to establish the bar as an anode and the plate as a cathode and to etch the material contacted by the electrolyte. It may be noted that while the electrolyte web tended to break well above the bottom of notch 46, when a bar was positioned in the notch, it provided a further support for the electrolyte and enabled the web to span a greater width as evidenced by the extension of the web further down the notch.

Following either of the electrolytic etches described above the bar is washed in a stream of high purity water and alcohol and dried in air. Fabrication of the device is completed by applying a base lead and a housing.

Localized areas of plane surfaces can also be processed by a stream of liquid in accordance with this invention. Point contact type transistors utilizing a wafer of germanium have been manufactured by a process including a modification of the electrolytic stream etch discussed above.

Figure 6:
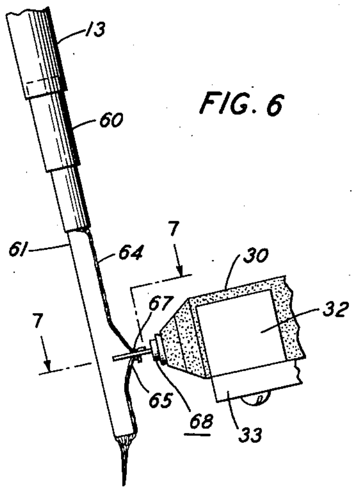
Fig. 6 illustrates in elevation another form of head for applying a stream of liquid to a limited portion of a body surface and which is suitable for substitution in the apparatus of Fig. 1.

The header assembly of a point contact transistor may be of substantially the same form as that of the junction type with the exception that a semiconductive wafer having a major face about 50 mils on a side is substituted for the bar 26 and is mounted so that that face is parallel to the plane defined by the eyelet 21 periphery and facing away from that eyelet. This face requires etching subsequent to the mounting of the wafer on the header and prior to the mounting of the emitter and collector points thereon. Etching is accomplished in accordance with the present method by mounting the header in a holding fixture 30 similar to that illustrated in Fig. 2 which, in turn, is mounted in an etching fixture of the type shown in Fig. 1 having an etching head modified as shown in Fig. 6. This head may be substituted for the nipple 15 and pins 12 of the bar etcher. It comprises a nipple 60 adapted to be secured in clamp 16 and to receive the end of tube 13 and arranged to support a pair of flat ribbon like members 61. The ribbons 61 are spaced about 40 mils apart to constitute effectively the walls of a channel 62 (best seen in Fig. 7), the longitudinal axis of which is inclined at about 30 degrees from the vertical. The bottom of the channel 62 may be formed of a blotting paper wick 63 which fills the space between the ribbons 61 with the exception of a small region along their upper edge. A convex meniscus or liquid web extending beyond the limits of the supporting ribbons 61 is obtained along this upper edge by flowing the stream of liquid 64 into the channel 62 at a rate sufficient to overfill it. A hump 65 is provided along the upper major edge of each ribbon 61 to provide a point along those edges at which the liquid stream 64 extends therefrom.

Liquid is applied to the exposed major face of the semiconductive wafer 67 on header assembly 68 by moving the arm 34 of the etching fixture to advance the wafer to the tip of hump 65. After the face of the wafer is wetted by the liquid stream 64 it can be backed off slightly to constrict the wetted area. The etching process can then be effected by biasing the wafter positive with respect to the electrolyte in the manner described above and passing an etching current across the semiconductor electrolyte interface. A suitable clean matte finish for the reception of point contacts can be realized by this process with a 30 second electrolytic etch at a current of five milliamperes in a 0.1 percent potassium hydroxide solution.

Figure 7:
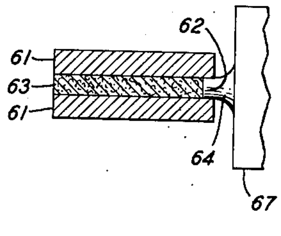
Fig. 7 is a view taken along line 7—7 of Fig. 6 showing the formation of a meniscus which provides a restricted area of liquid contact on the surface of a body.

While the preceding description has been directed to electrolytic etching of semiconductors, the process is equally applicable to chemical etching wherein the liquid support pins 12 or the elements of the supporting trough shown in Figs. 6 and 7 are of a material inert to the etchant.

It is to be understood that the above-described arrangements are illustrative of the application of the principles of the invention. Numerous other arrangements may be devised by those skilled in the art without departing from the spirit and scope of the invention.

What is claimed is:

1. The method of etching a localized surface portion only of a semiconductive bar, which comprises flowing a liquid etchant down a pair of members at a separation over which the surface tension of the liquid will sustain a web therebetween, and immersing said localized surface portion only in said web.

2. The method which comprises establishing a stream of etchant that flows continuously under the influence of gravity along a guiding structure to which the etchant adheres, and to which the etchant is held in stream form by virtue of surface tension, and immersing in the stream a single portion only of a semiconductive bar to be etched by said stream of etchant.

3. The method of continuously applying fresh etchant to a single localized band intermediate the ends of a semiconductive bar while maintaining the ends of the semiconductive bar free of etchant, which comprises mounting a pair of members each having a free end and being composed of a material to which the etchant will adhere at a separation over which the surface tension of the etchant will sustain a web thereof, feeding a stream of etchant into the region intermediate the members to wet the members and form a web of the etchant therebetween, establishing a pressure gradient in the web of etchant along said members to cause said etchant to flow along the members, introducing the localized band to be etched into the region between the free ends of said members, and advancing the band into the region between said members containing the web of flowing etchant.

4. The method of electrolytically etching a localized surface portion only of a semiconductive bar, which comprises flowing a liquid etchant down a pair of members at separation over which the surface tension of the liquid will sustain a web therebetween, immersing said localized surface portion only in said web, and passing electrical current across the interface between said web and said bar.

5. The method of electrolytically etching a localized surface portion only of a semiconductive bar which comprises guiding an electrically conductive liquid etchant down an inclined course defined at least in part by an elongated member wettable by the etchant, confining the etchant to a stream formed by surface tension, immersing said localized surface portion only in said stream, and passing electric current across the interface between said stream and said semiconductive bar.

6. The method of electrolytically etching a restricted surface area on a semiconductive bar intermediate its ends while maintaining the electrolyte out of contact with the bar ends, which comprises mounting a pair of rigid members of conductive material to which an aqueous electrolyte will adhere at a separation over which the surface tension of the electrolyte will sustain a web thereof with the axes of said members inclined with respect to the horizontal, mounting the semiconductive bar with the area to be etched in the region between the members, supplying liquid to the region between the members at a point above the restricted surface area, establishing contact between the liquid and the body over said restricted area, sustaining contact between the stream of liquid flowing along said members and the restricted area by the forces of adhesion and surface tension, electrically biasing the ends of said semiconductive bar positive with respect to the conductive members, and passing current through said electrolyte and between said semiconductive bar and said members.

7. The method of electrolytically etching a restricted region of the surface of a semiconductive bar intermediate its ends, which comprises establishing a stream of etchant that flows along a guiding structure to which the etchant adheres and to which the etchant is held in stream form by virtue of surface tension, positioning said semiconductive bar in said stream whereby said restricted region only is contacted by said stream, discharging said etchant from said guiding structure at substantially the same rate it is supplied thereto to prevent it from spreading beyond the restricted region, and passing electrical current between said etchant and said semiconductive bar.

References Cited in the file of this patent

UNITED STATES PATENTS

| | | |
|---|---|---|
| 1,065,090 | Werth | June 17, 1913 |
| 1,773,135 | Flanzer | Aug. 19, 1930 |
| 2,369,769 | Bauer | Feb. 20, 1945 |
| 2,395,437 | Venable | Feb. 26, 1946 |
| 2,649,756 | Egee et al. | Aug. 25, 1953 |

FOREIGN PATENTS

| | | |
|---|---|---|
| 688,156 | Germany | Feb. 14, 1940 |
| 373,398 | Germany | Apr. 12, 1923 |